(No Model.) 4 Sheets—Sheet 1.
J. E. FULLER.
COMBINED AMMONIA DISTILLING AND REFRIGERATING APPARATUS.
No. 489,897. Patented Jan. 10, 1893.
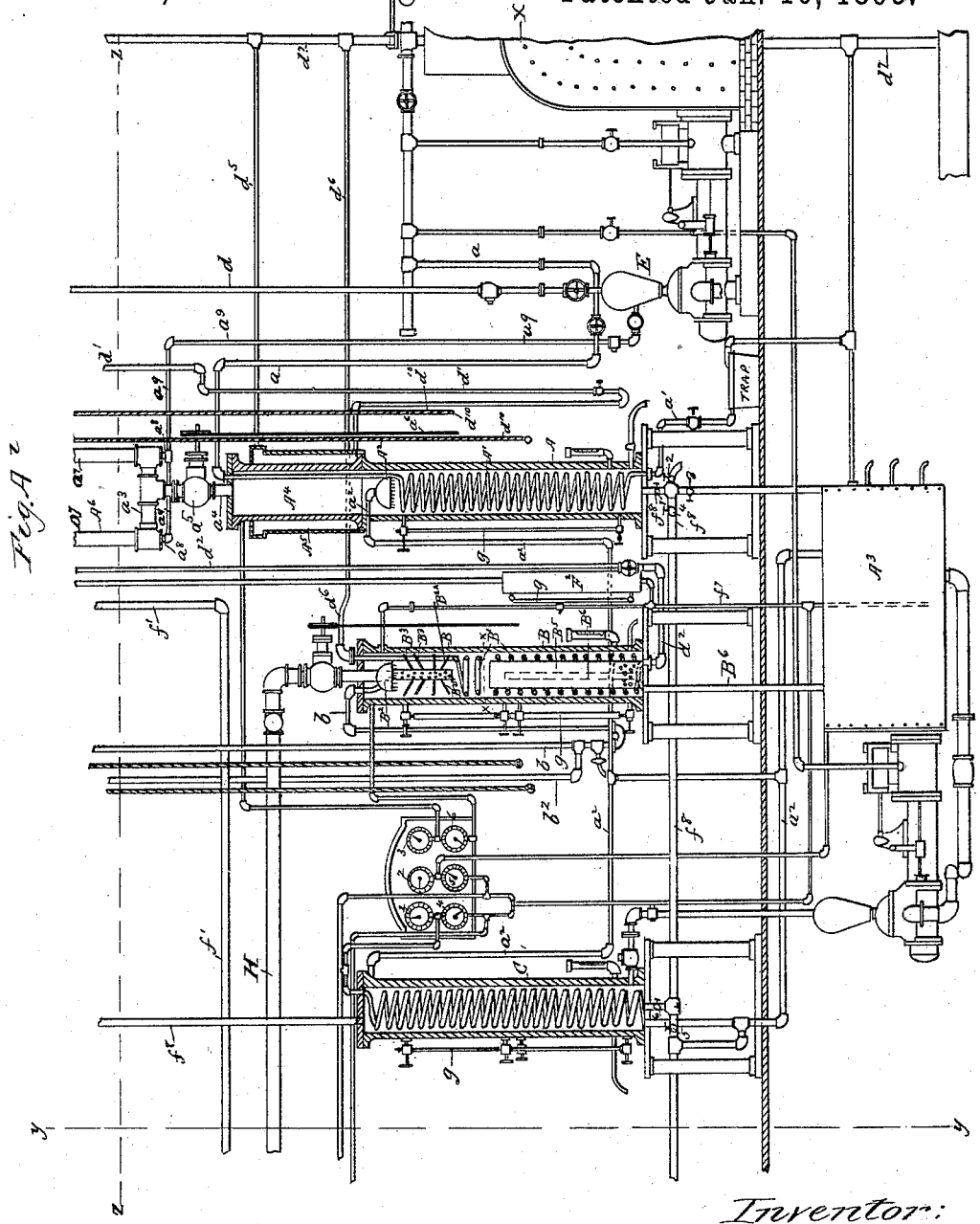

(No Model.) 4 Sheets—Sheet 2.

J. E. FULLER.
COMBINED AMMONIA DISTILLING AND REFRIGERATING APPARATUS.

No. 489,897. Patented Jan. 10, 1893.

Fig. A2.

Witnesses:
T. C. Stuart
Charles Crump

Inventor:
J. Ensign Fuller,
By Marble + Mason,
Attys.

(No Model.) 4 Sheets—Sheet 3.
J. E. FULLER.
COMBINED AMMONIA DISTILLING AND REFRIGERATING APPARATUS.
No. 489,897. Patented Jan. 10, 1893.
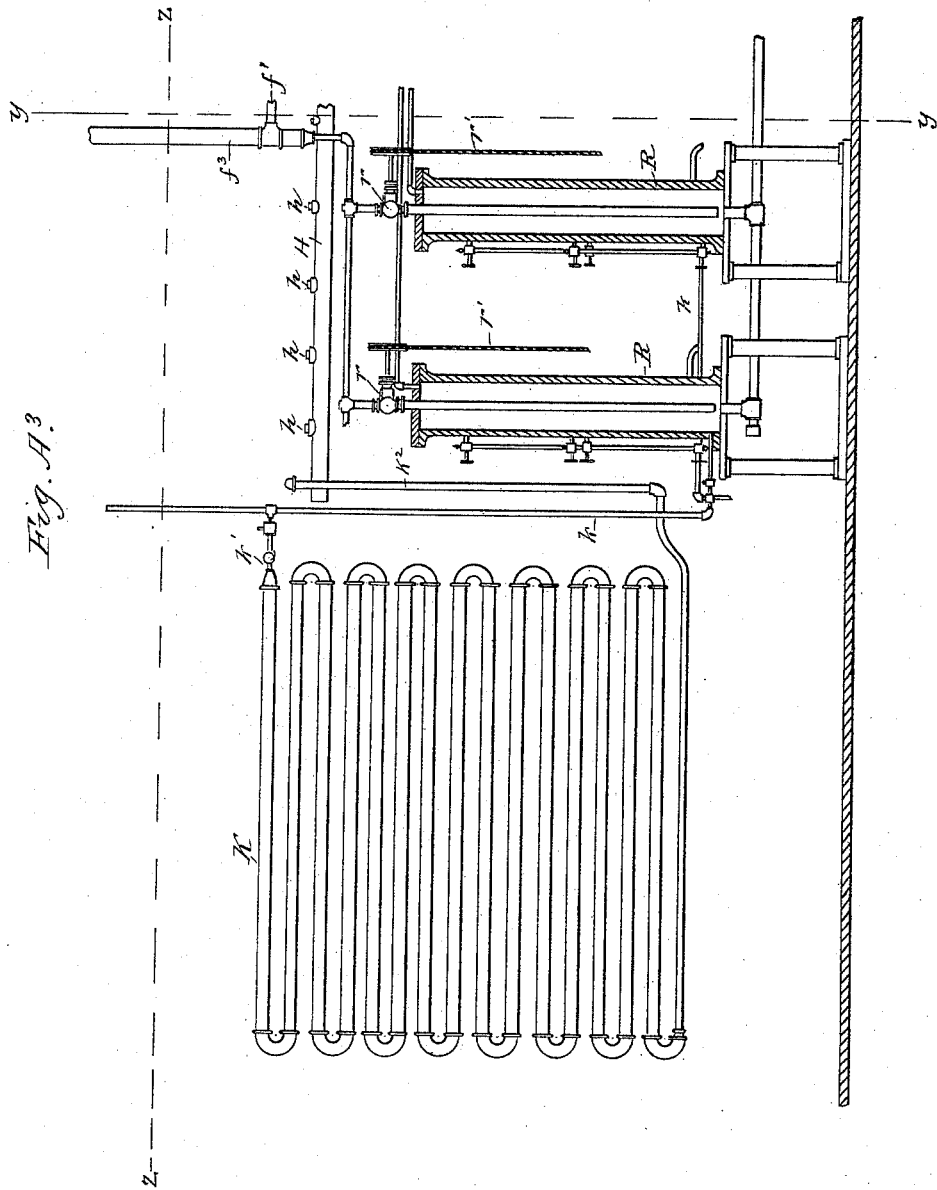

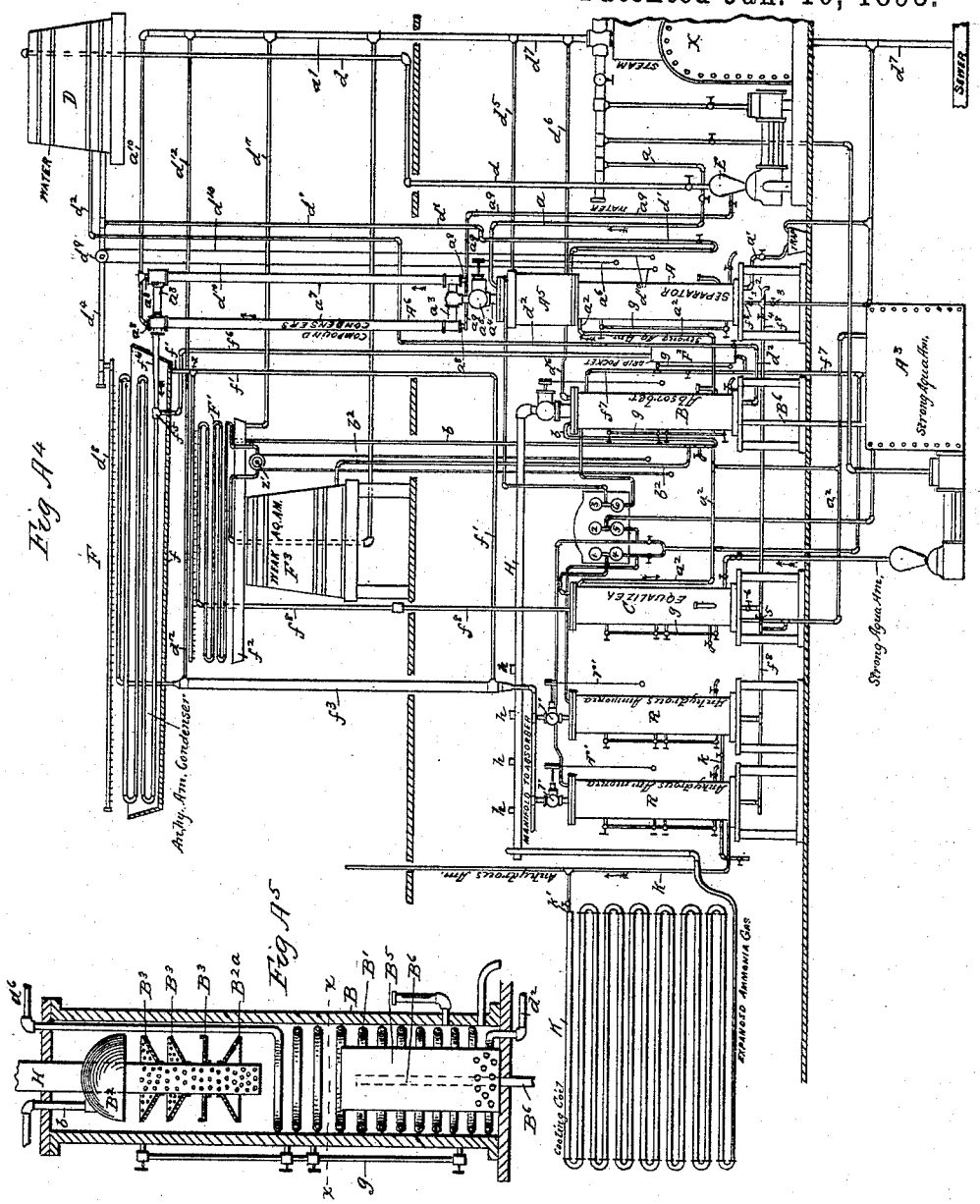

UNITED STATES PATENT OFFICE.

J. ENSIGN FULLER, OF NEW YORK, N. Y., ASSIGNOR TO THE CONSOLIDATED REFRIGERATING COMPANY, OF SAME PLACE.

COMBINED AMMONIA-DISTILLING AND REFRIGERATING APPARATUS.

SPECIFICATION forming part of Letters Patent No. 489,897, dated January 10, 1893.

Application filed April 2, 1888. Renewed June 16, 1892. Serial No. 436,995. (No model.)

*To all whom it may concern:*

Be it known that I, J. ENSIGN FULLER, a citizen of the United States, residing at New York, in the county of New York and State of New York, have invented certain new and useful Improvements in Combined Ammonia-Distilling and Refrigerating Apparatus; and I do hereby declare the following to be a full, clear, and exact description of the invention, such as will enable others skilled in the art to which it appertains to make and use the same.

My invention relates to a combined ammonia distilling and refrigerating apparatus, and consists in the construction and arrangement of its parts, as well as their relation to each other, which will be more fully hereinafter described and particularly pointed out in the claims.

The object of my invention is to provide an apparatus with which anhydrous ammonia of a high degree of purity may be cheaply and rapidly distilled from the aqua ammonia of commerce, and when produced, may be safely and economically employed therewith as a refrigerating agent, and after being so used, may be recovered in said apparatus by means of an absorbent such as water, and again distilled and prepared for use as before, without material loss or wastage, and so on indefinitely.

A further object of my invention is to so construct and arrange said apparatus that it may be easily controlled and managed in its operation. These results I accomplish with the apparatus illustrated in the accompanying drawings, Figures A', A$^2$, A$^3$, A$^4$ A$^5$ forming a part of this application, which show the entire apparatus in elevation and partly in section.

Referring to Fig. A' of said drawings, A, represents a hollow cylinder or still made of sheet or cast metal, provided with one or more internal coils A' for conducting steam through said cylinder to heat it, which coils, are connected by a pipe, $a$, to a steam boiler of ordinary construction in the usual manner and have an outlet $a'$ leading to a trap as shown. Within said cylinder and above the coil A', a rose A$^2$ is suspended from a pipe $a^2$ which pipe leads to a supply tank A$^3$ through an equalizer C. Above the coil A' and rose A$^2$ and within the cylinder, there is a separating chamber A$^4$, which is inclosed or surrounded by a water chamber A$^5$ formed as shown for cooling the chamber A$^4$ and thereby condensing the watery vapor in part and separating the same from the ammoniacal vapor arising therein from the coil A'. The rose A$^2$, and the compound stand-pipe A$^6$, shown in part in Fig. A' and in part in Fig. A$^2$ are claimed in an application filed by me in the United States Patent Office on the 21st day of May A. D. 1887 Serial No. 238,967 and hence their construction and operation will be described herein only so far as may be necessary to show their utility in this apparatus. The rose A$^2$ is of ordinary construction, the lower side being perforated so as to divide the aqua ammonia delivered therein through the pipe $a^2$ into minute drops or jets, and cause the same to descend onto the steam coil or coils A' in the form of a spray. The stand-pipe A$^6$ is composed of two hollow head-pieces $a^3$ $a^3$ the lower head-piece connecting with the still A by a short pipe $a^4$ which is provided with a cut-off valve $a^5$ operated by hand-cord $a^6$. The head-pieces $a^3$ $a^3$ are connected together by two pipes $a^7$ $a^7$ of sufficient diameter to permit other pipes of smaller diameter to pass therethrough and leave a sufficient space between said pipes for the passage of the vapors from the still. Passing through the ends of the lower head-piece $a^3$ are two pipes $a^8$ $a^8$, which pipes pass up through the pipes $a^7$ $a^7$ and out through the ends of the upper head-piece $a^3$. These pipes $a^8$ $a^8$ are connected at their lower ends by a pipe $a^9$ which leads to the pump E. The pipes $a^8$ $a^8$ are connected at their upper ends by a pipe $a^{10}$ which leads to and is connected with the pipe $d^7$, which leads to the sewer.

In operation the vapors from the still pass through the stand-pipe A$^6$ in the narrow spaces between the pipes $a^7$ $a^7$ and the pipes $a^8$ $a^8$ and thence to the condensing coil F through the pipe $f^4$. While the very hot vapors are thus passing through said narrow spaces, cold water is forced up through the pipes $a^8$ $a^8$ by the pump E through the pipe $a^9$ and out to the discharge pipe $d^7$ through the pipe $a^{10}$. In this way the hot vapors arising from the still are subjected to the cooling effect of the atmosphere from the outside pipes $a^7$ $a^7$, and of the cold water from the inner pipes $a^8$ $a^8$ before they reach the condensing coil F, and all of the watery vapor is thus condensed and separated from the ammoniacal vapor thereby.

D represents a water tank and is supplied with water through the pipe $d$ from any convenient source by the pump E. From tank D water is supplied to the water chamber of jacket $A^5$ by pipes $d'$. The water flows out of said water chamber $A^5$ through pipes $d^5$ $d^7$. Water is also supplied from tank D to the sprinkler $d^8$ over the condensing coil F through the pipe $d^4$ which is provided with a cut-off valve $d^9$ that is operated by hand-cords $d^{10}$ $d^{10}$ to let the water on or cut it off. The condensing coil F is provided with a trough $f$, to catch the water trickling over the same from the sprinkler $d^8$. The water so caught is carried by pipe $f'$ to the sprinkler over the cooling coil F' and is taken up by its trough $f^2$ and carried by pipe $d^{11}$ to pipe $d^7$ and thence to sewer, or by said pipe $f'$ the water may be carried to the jacketed pipe $f^3$ and thence up and out to pipe $d^7$ by pipe $d^{12}$ and thence to sewer, or it may be made to flow to both the sprinkler of the cooling coil and the jacketed pipe $f^3$ at the same time by adjusting the cock $z$ so as to permit a portion of the water to flow from the trough $f$ into the sprinkler over the coil F' and the balance of said water to flow through the pipe $f'$ and into the jacketed pipe $f^3$ and thence through the pipe $d^{12}$ and pipe $d^7$ to the sewer. The jacketed pipe $f^3$ is constructed with an outer and inner pipe leaving a space between, so that the water from trough $f^2$ may be carried up therethrough to still further cool the ammoniacal vapor before it reaches the anhydrous reservoirs R R which are of ordinary construction the entrance to which is controlled by the cocks $r$ $r$ which are opened and closed by the hand-cords $r'$ $r'$.

It has been found that occasionally some watery vapor enters the condensing coil F from the stand-pipe $A^6$, and to prevent this absolutely, I provide a short pipe $f^4$ of diminishing diameter from the stand-pipe $A^6$ until its junction with the lower link of the coil at $f^5$. At the point $f^5$, a pipe $f^6$ leads downward to a drip pocket $F^2$ for the purpose of conveying and receiving any vapors which may have been condensed in liquid at said point. It has been found that any liquid which is received in said drip pocket $F^2$ as aforesaid is aqua ammonia and I therefore provide that it may be taken from said pocket to the supply tank $A^3$ by the pipe $f^7$.

The apparatus shown in the drawings as thus far described is operative for the purpose of distilling anhydrous ammonia. To facilitate such distillation however, and provide for the convenient and practical use of such ammonia as a refrigerant and the recovery of the same for redistillation and for use again, I have provided and combined therewith, an equalizer, absorber, aqua ammonia reservoir, and refrigerating coils, one of which is shown with its connections.

In the distillation of anhydrous ammonia in an apparatus of the construction thus far described it is found that some ammonia will be left in the water in the bottom of the still A, although the same is raised to a higher degree of heat then 180° Fahrenheit. In order to recover this ammonia and at the same time not retard the work I provide a reservoir $F^3$, to contain such aqua ammonia, and connect the bottom of the still A therewith by a pipe $f^8$ through the coil in equalizer C and the cooling coil F'. When still A becomes partially filled with this weak ammonia—say one third the height of the coil A', the discharge cocks in the pipe $f^8$ are closed and the cocks opening said pipe to the tank $F^3$ are opened and the pressure in the still forces said ammonia up into said reservoir. The equalizer C being full of cold aqua ammonia from the tank $A^3$ the weak aqua ammonia from the still is partially cooled thereby and it is further cooled in its passage through the cooling coil F' over which cold water is constantly dripping from its sprinkler. The cooling of this aqua ammonia is necessary in order to make it a good absorbent as will be hereinafter explained.

K represents a cooling coil or heat-absorber of ordinary construction and is connected by pipes $k$ $k$ to the anhydrous ammonia reservoirs R R through an expansion cock or valve $k'$. The ammoniacal vapor or fully expanded gas is conveyed from the coil K by a pipe $k^2$ which connects with a manifold pipe H leading to and into the absorber B. But one cooling coil is shown, but the connection of other such coils with the pipe H are shown at $h$ $h$ $h$ $h$. Thus the expanded gas from one or any number of cooling coils is conveyed to the absorber B.

The absorber B consists of a metallic cylinder and is provided with a spiral coil B' through which water is caused to flow from the reservoir D in the pipe $d^2$ to assist in cooling the ammoniacal gas coming in from the manifold H and absorbed by the aqua ammonia from the coil F' or reservoir $F^3$. The manifold H projects downward near to the coil B' a few inches and is perforated so as to allow the ammoniacal gas to readily escape therefrom.

Near the upper end of the absorber B and within the same surrounding the manifold H is an atomizer $B^2$ of hemispherical shape, the lower side of which is perforated. A pipe $b$ entering the top of the absorber, connects the atomizer $B^2$ with the coil F' and by a branch pipe $b^2$ leading from pipe $b$ the atomizer is connected with the reservoir $F^3$ so that weak aqua ammonia may be brought from said coil or reservoir or both to be used as an absorbent.

Below the atomizer and surrounding the manifold H are finely perforated distributers $B^3$ of circular shape as shown in section, made of any suitable material, preferably of metal. The aqua ammonia is delivered from the coil F' or from the reservoir F³ or from both in the atomizer B² through the pipe $b$ and passes out of the same in jets or in the form of a spray. Passing on down it strikes the distributers B³ in turn, each of which in passing therethrough serves to keep it in a finely divided or spray like form. B²ᴬ is a funnel-shaped deflector, not perforated, surrounding the manifold H. As the aqua ammonia strikes the deflector B²ᴬ it is thrown outward and on to the coil B' and is thereby cooled.

Resting on the bottom of the absorber B is a cylinder B⁵ closed at the top and having large holes or perforations near the bottom. A pipe B⁶ within the cylinder B⁵ and open at the top, passes down through the bottom of the absorber B to the reservoir A³. By this absorber, the ammoniacal gas expanded in the heat absorbers and collected in the manifold H, as above described, is brought in contact with weak aqua ammonia and by it taken up and absorbed until such aqua ammonia attains the same strength as that with which the operation of the apparatus was commenced, when by the pipe B⁶ it is conveyed to the reservoir A³ for distillation and use again. The absorption of the ammoniacal gas by the weak aqua ammonia is greatly facilitated by having said gas brought in contact therewith in a finely divided condition or spray like form.

It is a well known fact that in a vessel containing aqua ammonia, that which is at or near the top will have the highest percentage of ammonia. Having this fact in view I have placed within the absorber the cylinder B⁵ closed at the top and provided with openings at the bottom. In practice the absorber B is kept filled with aqua ammonia a little above the top of the cylinder B⁵—say as far up as the line $x$—$x$—and as the contents are drawn off through the pipe B⁶ only when in operation, a current is formed by drawing the ammonia out of the absorber proper into the cylinder B⁵ at or near the top of the latter by the pipe B⁶ to the reservoir A³. By drawing the contents of the absorber off in this way the strongest ammonia is at all times obtained therefrom and transferred to the supply reservoir A³.

The still, absorber, equalizer, anhydrous ammonia reservoir, and drip pocket are each provided with gages $g$ to show the depth of liquid therein, and I also provide pressure gages 1, 2, 3, 4, 5 and 6 which are connected by pipes to said still and other parts above named by which the pressure therein is indicated, and when found too great may be regulated by discharge cocks as shown.

The operation of the apparatus is as follows: Steam, being provided in the boiler X, is let into the coil A' through the pipe $a$, and, when the temperature in said still reaches 180° Fahrenheit, aqua ammonia from the tank A³ is pumped up into the equalizer C, and from thence is carried by pressure through pipe $a^2$ to still A and discharged through rose A² in the form of a spray onto coil A'. The vapors arising in the still are in part separated in the chamber A⁴, in part in the stand-pipe A⁶ and in part in the condensing coil F, the watery vapor being condensed and falling back into the still or drip pocket F². The ammoniacal vapor being freed from the watery vapor, as just stated, passes on through the condensing coil F and down into one of the receivers R R where it becomes a liquid, from which it may be drawn off into tanks, or it may be conveyed directly from thence to a heat absorbing coil as K. When it is conducted directly from one of the receivers R R to a coil as K, and there released and vaporized, the vapor flows through said heat absorber and thence up and through the manifold H and over into the absorber B where it is taken up by the aqua ammonia from coil F' and tank F³. It has been found that cold water or cold aqua ammonia absorbs ammoniacal vapors much more rapidly and effectively than warm or tepid water or ammonia. For this reason the weak ammonia from the still A is cooled as much as possible through the equalizer and the cooling coil F', in order that it may the better take up the ammoniacal vapor in the absorber B.

It will be seen from the foregoing description that all of the ammonia with which the operation above mentioned may be made is returned to the absorber B, either as weak aqua ammonia or as ammoniacal vapor, and when returned as a vapor it is taken up by the weak aqua ammonia from the tank F³ or coil F' which is thereby enriched, and by properly regulating the flow of the aqua ammonia to the vapor, a product may and will be obtained of the same degree of strength as the aqua ammonia with which the operation was commenced. When this result is obtained, the contents of the absorber are discharged into the tank A³ to be pumped into the still A as before and so on indefinitely.

The feature which I deem of greatest importance in this apparatus, is the series of reservoirs, by which its operation can be controlled and rendered practically useful. Starting with the reservoir A³, the original source of supply, the aqua ammonia is conveyed to the still A and there vaporized, while the ammoniacal and watery vapors are separated in the cooling chamber A⁴, stand-pipe A⁶ and coil F, and from thence conveyed in a liquid state to one of the anhydrous receivers or reservoirs R R, the weak aqua ammonia being at the same time carried up to the weak aqua ammonia reservoir F³. By means of said reservoirs, and the reservoir D, containing water, the operation of the apparatus may be suited to any season or climate. As in heating, so in cooling, it is found that at different seasons of the year, and on different days of the same season, a greater or less amount of refrigeration is required.

The distilling apparatus proper, as shown is capable of producing a much larger quantity of anhydrous ammonia per day than will be used in the largest establishments, and, hence, it will not be necessary to have it in operation every day or the whole of any day. During the distillation the anhydrous ammonia will be stored in reservoirs, such as R R, any number of which may be provided and connected, and the weak aqua ammonia will be stored in one or more reservoirs like $F^3$. When sufficient anhydrous ammonia has been produced, the still may be shut down, and the refrigeration which has been going on by the heat absorbers, while the distillation was proceeding, may be continued from the supply on hand, the expanded gas from such heat absorbers being conveyed through the manifold H to the absorber B, and there taken up by the aqua ammonia from the reservoir $F^3$ or coil $F'$, and the water for cooling the coil $B'$ in absorber B being supplied from the reservoir D, while the aqua ammonia from said absorber is drawn off and stored in reservoir $A^3$ from which it may again be pumped into the still as before. It will thus be seen that the refrigeration is made continuous by means of said reservoirs above named, while the distillation is intermittent or periodical.

Having thus described my invention, what I claim and desire to secure by Letters Patent is:—

1. In a combined ammonia distilling and refrigerating apparatus, the combination with a supply tank, equalizer, still stand-pipe, condensing coil, receiver, cooling coil, absorber, and pipe connections, of an elevated reservoir as D for supplying water to the still, condensing coils, and absorber, substantially as described.

2. In a combined ammonia distilling and refrigerating apparatus, the combination with a supply tank, equalizer, still stand-pipe, condensing coil, receiver, cooling coil, absorber, and pipe connections, of elevated reservoirs as $F^3$ and D, substantially as described.

3. In a combined ammonia distilling and refrigerating apparatus, the combination of an anhydrous receiver, cooling coil, absorber, elevated weak aqua-ammonia reservoir, as $F^3$, supply and receiving tank, as $A^3$, and pipe connections, whereby the process of refrigeration may be carried on while the process of distillation is temporarily discontinued, substantially as described.

4. In a combined ammonia distilling and refrigerating apparatus, a still as A, consisting of a cylinder provided with a heating coil as $A'$, a rose as $A^2$, a separating chamber as $A^4$ surrounded by a water chamber as $A^5$, and having inlets and outlets, substantially as described.

5. In a combined ammonia distilling and refrigerating apparatus, an absorber consisting of a cylinder provided with a spiral cooling coil, a mixing cylinder closed at the top within said coil having a discharge pipe as $B^6$, a perforated gas discharge pipe entering said absorber, an atomizer perforated on its under side surrounding said gas discharge pipe, circular finely perforated distributers, as $B^3$, and a deflector, as $B^{2A}$, substantially as described.

In testimony whereof I affix my signature in presence of two witnesses.

J. ENSIGN FULLER.

Witnesses.:
 J. C. ANDRESS,
 GEO. M. BROOKS.